United States Patent [19]

Trendel et al.

[11] Patent Number: 5,415,050
[45] Date of Patent: May 16, 1995

[54] METHOD AND APPARATUS FOR MEASURING THREADED CLOSURE APPLICATION TORQUE

[75] Inventors: Alois F. Trendel, Temperance, Mich.; Albert T. Spencer, Liberty Center, Ohio

[73] Assignee: Owens-Brockway Glass Container Inc., Toledo, Ohio

[21] Appl. No.: 22,241

[22] Filed: Feb. 25, 1993

[51] Int. Cl.⁶ .................................................. G01L 5/24
[52] U.S. Cl. ................. 73/862.23; 73/862.21; 53/490
[58] Field of Search ........... 73/862.08, 862.21, 862.23, 73/847; 53/331.5, 490; 209/546

[56] References Cited

U.S. PATENT DOCUMENTS

| | | | |
|---|---|---|---|
| 2,337,951 | 12/1943 | Whitehead | 73/847 |
| 2,552,407 | 5/1951 | Crabbe | 73/862.23 X |
| 4,222,215 | 9/1980 | Takano | 53/331.5 |
| 4,494,358 | 1/1985 | Zalkin | 53/331.5 |
| 4,535,583 | 8/1985 | Tanaka et al. | 53/331.5 X |
| 4,614,077 | 9/1986 | Muto et al. | 53/490 |
| 4,674,340 | 6/1987 | Burt et al. | 73/862.23 |
| 4,696,144 | 9/1987 | Bankuty et al. | 53/331.5 |
| 4,794,801 | 1/1989 | Andrews et al. | 73/862.23 |
| 4,808,976 | 2/1989 | Kiefer et al. | 340/665 |
| 4,811,850 | 3/1989 | Bankuty et al. | 209/546 |
| 4,907,700 | 3/1990 | Bankuty et al. | 73/862.23 X |
| 4,989,459 | 2/1991 | Faber, Jr. | 73/862.23 |
| 5,319,984 | 6/1994 | Humphries et al. | 73/862.23 X |

FOREIGN PATENT DOCUMENTS

| | | | |
|---|---|---|---|
| 2480940 | 10/1081 | France | 73/862.21 |
| 0129717 | 10/1980 | Japan | 73/862.21 |

*Primary Examiner*—Richard E. Chilcot, Jr.
*Assistant Examiner*—Elizabeth L. Dougherty

[57] ABSTRACT

A self-contained apparatus for measuring threaded closure application torque that includes a container-shaped enclosure having a threaded finish portion configured to receive a threaded closure. A sensor is disposed within the enclosure and operatively coupled to the threaded finish portion thereof for supplying an electrical signal as a function of torque applied to the finish portion. Electronic circuitry within the enclosure is responsive to such signal for indicating torque applied to the threaded finish portion of the enclosure as a closure is threaded thereon. In use, the apparatus is inserted among containers being fed in succession through a closure application system, such that a closure is applied by the system to the threaded finish portion of the apparatus. The apparatus is thereafter removed from among the containers following application of closures to the apparatus and containers, and closure application torque is determined as a function of electrical signals stored within the apparatus.

7 Claims, 5 Drawing Sheets

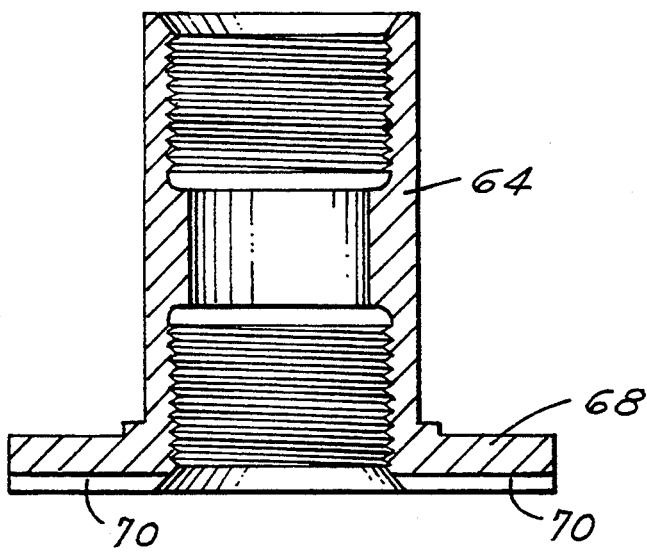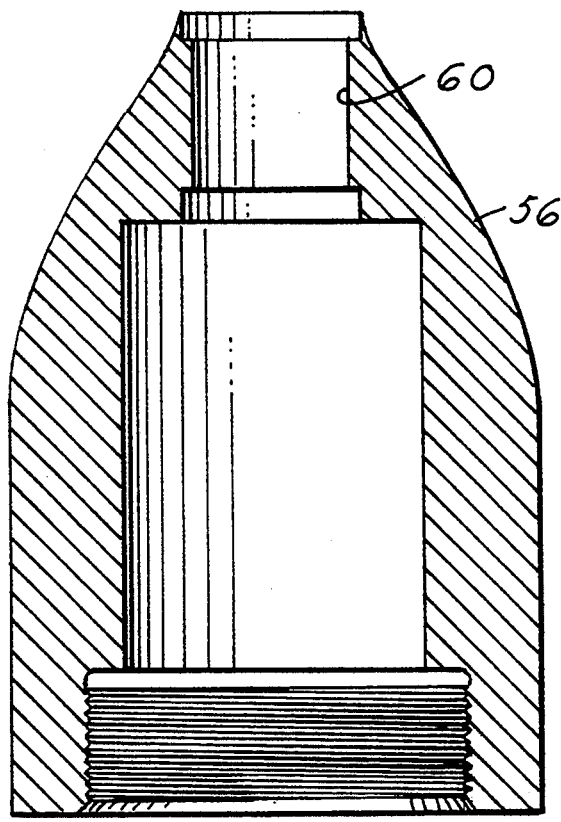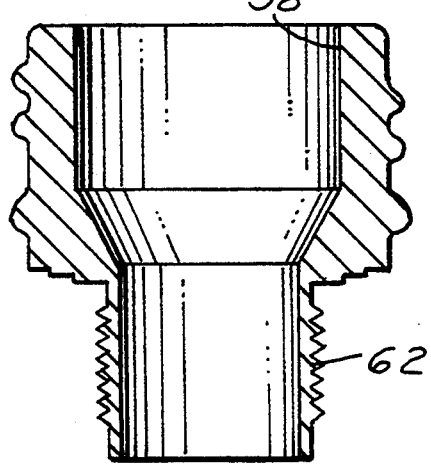

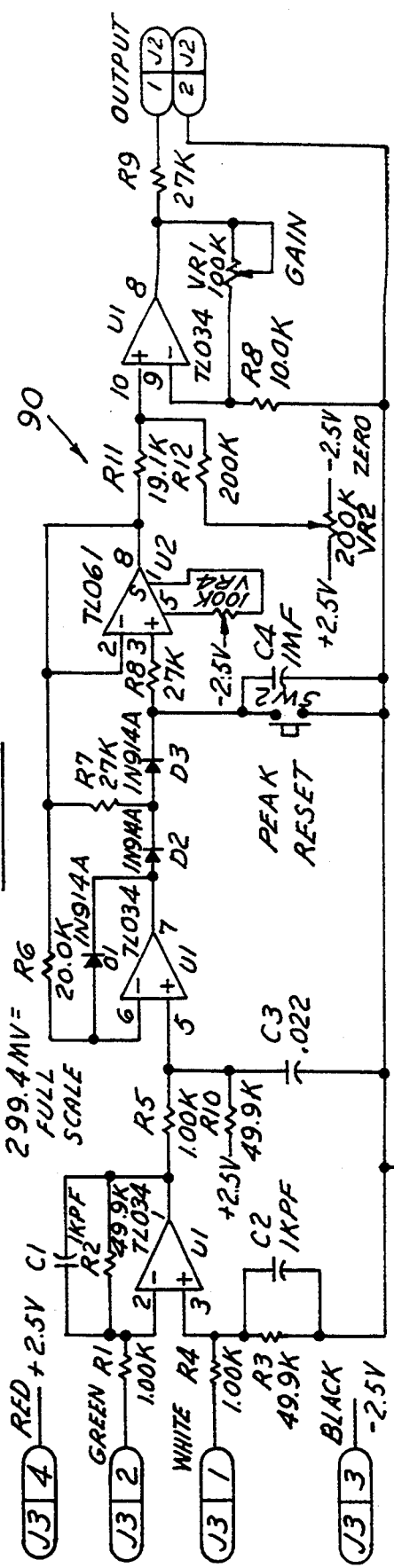
FIG.12
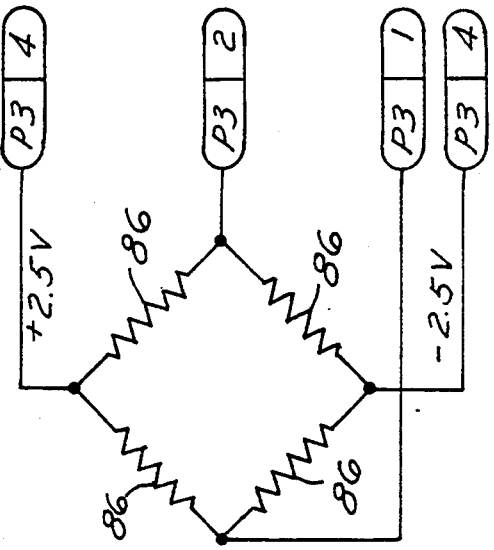
FIG.11
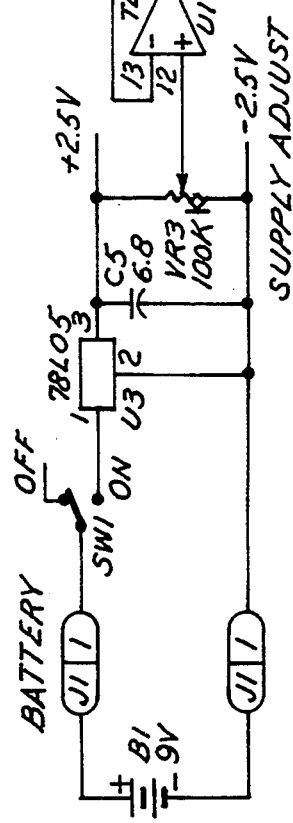

METHOD AND APPARATUS FOR MEASURING THREADED CLOSURE APPLICATION TORQUE

The present invention is directed to systems for application of threaded closures to containers, such as plastic caps to bottles, and more particularly a method and apparatus for measuring closure application torque.

BACKGROUND AND OBJECTS OF THE INVENTION

A variety of systems have heretofore been proposed for applying threaded closures to containers. One such system for applying plastic caps to bottles is disclosed in U.S. Pat. No. 5,012,630. Such systems are designed and intended to tighten the closures or caps to a prespecified torque. It is important to maintain the tightening torque within specified limits since an over-tightened cap may rupture the cap or container, while an under-tightened cap may result in leakage of fluid or carbonation.

In general, two techniques have been employed for measuring threaded closure application torque. In the first technique, containers are removed from the conveyor system after the closures or caps have been applied thereto, and transported to a separate station at which the closures are removed while the torque of removal is monitored. Separate and fairly complex measurement apparatus is therefore required, and the torque measurement information is not immediately available to the system operator for implementation of any necessary adjustment. In the other technique, torque measurement apparatus is included in the closure application system itself, measuring application torque as each closure is threaded onto a container. Although the measurement information is immediately available to a system operator, this technique also requires fairly expensive torque measurement apparatus, particularly in application systems having multiple heads.

It is a general object of the present invention to provide a method and apparatus for measuring threaded closure application torque that may be employed for in-line measurement of torque applied by the application system during operation, that measure application torque at system operating speed, that rapidly provide measurement information to a system operator for implementation of any required adjustment, and that may economically be implemented in existing or new closure application systems without redesign or refurbishment of the system itself.

SUMMARY OF THE INVENTION

In accordance with the present invention, a self-contained apparatus for measuring threaded closure application torque includes container-shaped enclosure that has a threaded finish portion configured to receive a threaded closure. A sensor is disposed within the enclosure and operatively coupled to the threaded finish portion thereof for supplying an electrical signal as a function of torque applied to the finish portion. Electronic circuitry within the enclosure is responsive to such signal for indicating torque applied to the threaded finish portion of the enclosure as a closure is threaded thereon. In use, the apparatus is inserted among containers being fed in succession through a closure application system, such that a closure is applied by the system to the threaded finish portion of the apparatus. The apparatus is thereafter removed from among the containers following application of closures to the apparatus and containers, and closure application torque is determined as a function of electrical signals stored within the apparatus.

In the preferred embodiment of the invention, the finish portion of the enclosure is mounted for rotation with respect to the remainder of the enclosure. A load sensor assembly is mounted within the enclosure and coupled to the finish portion of the enclosure for developing the electrical measurement signal as a function of torque applied to the finish portion of the enclosure with respect to the remainder of the enclosure. The electronic circuitry stores the maximum or peak value of the sensor signal as indicative of the torque applied to the closure. The stored signal is scaled for direct reading in units of torque, and may be reset by an operator for reinsertion through the closure application system.

BRIEF DESCRIPTION OF THE DRAWINGS

The invention, together with additional objects, features and advantages thereof, will be best understood from the following description, the appended claims and the accompanying drawings in which:

FIG. 8 is a sectional view of the drive spindle in the apparatus illustrated in FIGS. 3 and 4;

FIG. 9 is a sectional view of the top shoulder portion of the enclosure in the apparatus of FIGS. 3 and 4;

FIG. 10 is an elevated sectional view of the finish portion of the apparatus illustrated in FIGS. 3 and 4;

FIG. 11 is an electrical schematic diagram that illustrates interconnection of the load cells in the apparatus of FIGS. 3 and 4; and FIG. 12 is an electrical schematic diagram that illustrates the electronic circuitry of the apparatus in FIGS. 3 and 4.

DETAILED DESCRIPTION OF PREFERRED EMBODIMENT

Figure 1:
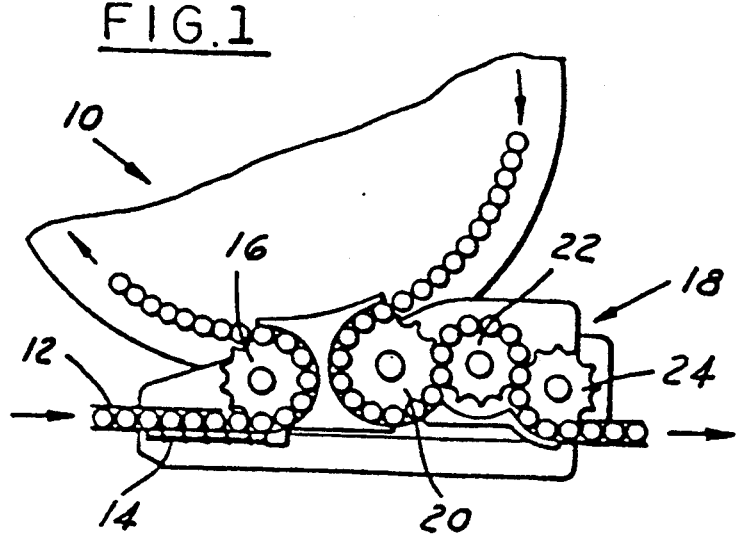
FIG. 1 is a schematic plan view of a closure application system in connection with which the present invention may be employed.
Figure 2:
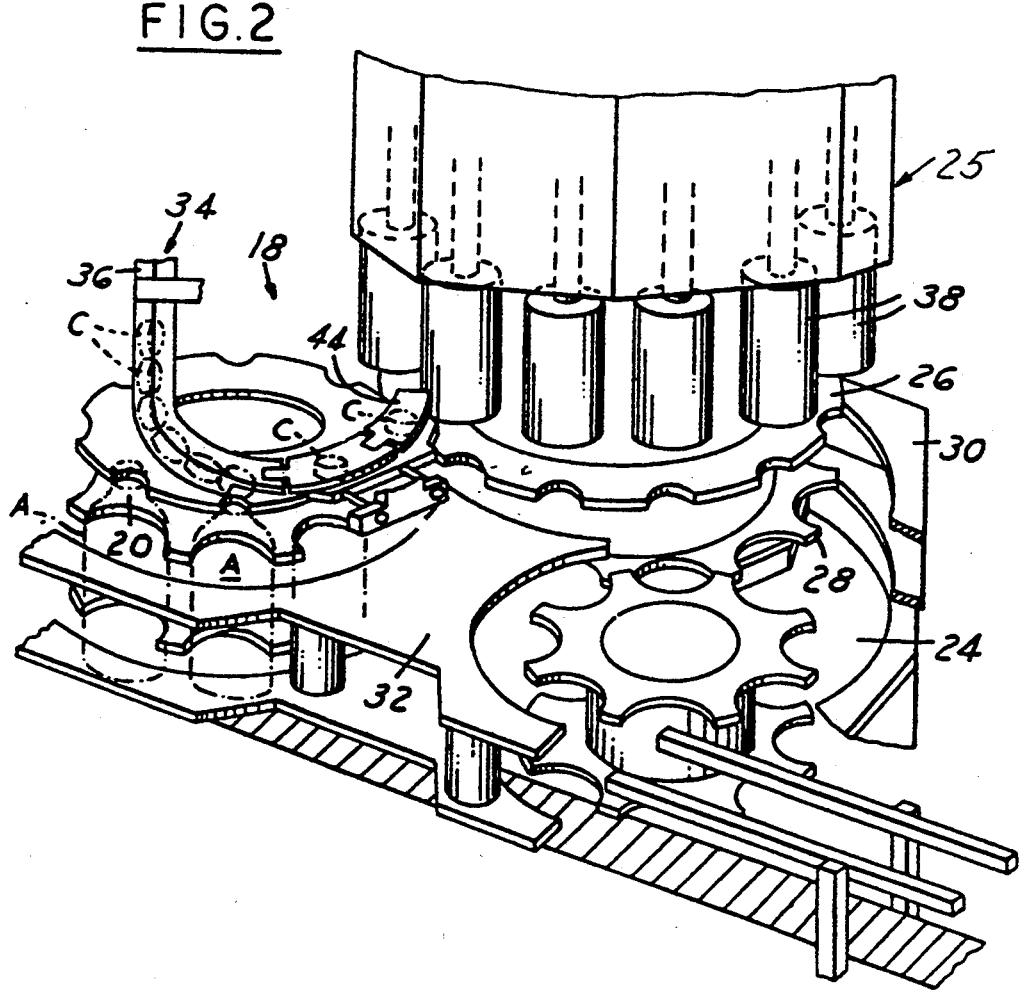
FIG. 2 is a fragmentary perspective view of the system of the closure application system illustrated in FIG. 1.
Figure 3:
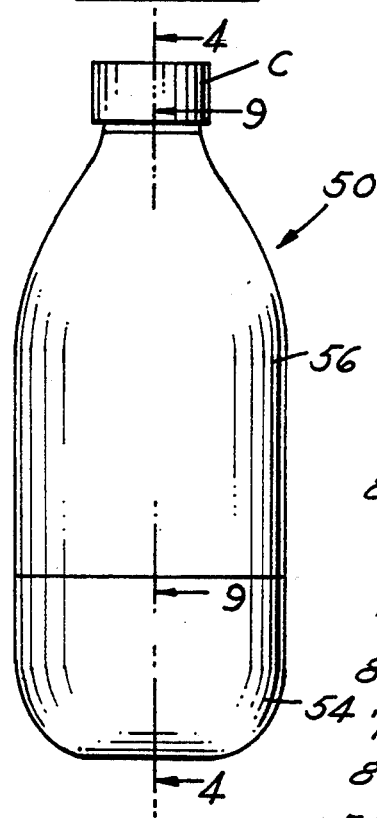
FIG. 3 is an elevational view of apparatus for measuring threaded closure application torque in accordance with a presently preferred embodiment of the invention.
Figure 4:
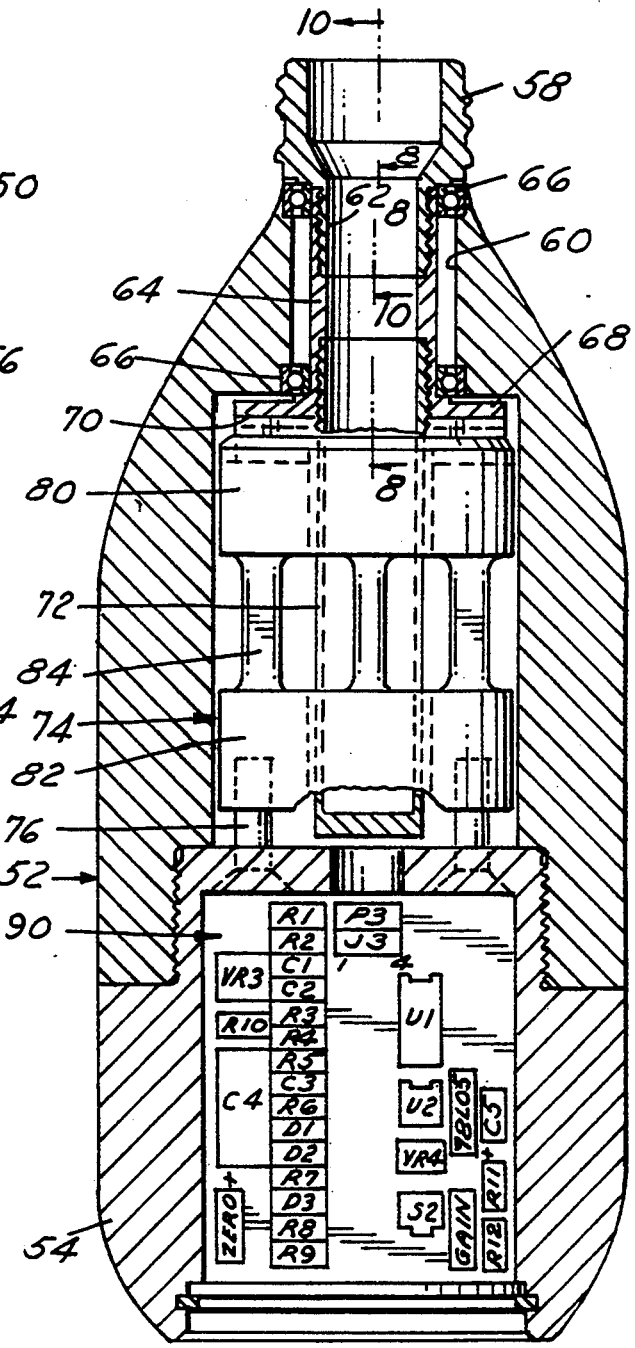
FIG. 4 is a sectional view of the apparatus illustrated in FIG. 3 on an enlarged scale, being taken substantially along the line 4—4 in FIG. 3.
Figure 5:
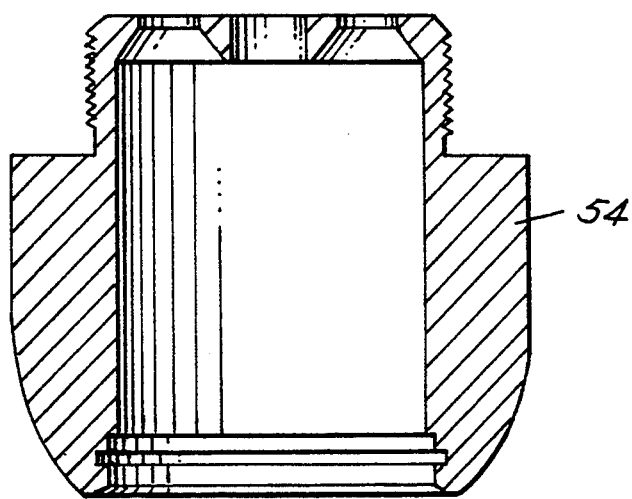
FIG. 5 is a sectioned elevational view of the base of the apparatus illustrated in FIGS. 3 and 4.
Figure 6:
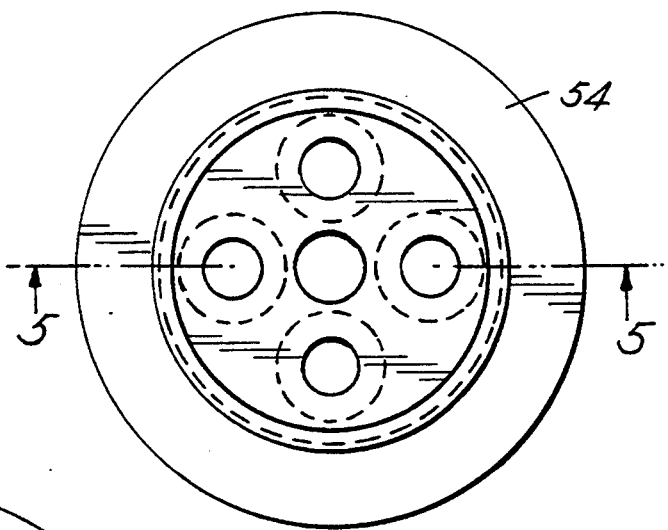
FIG. 6 is a top plan view of the apparatus base illustrated in FIG. 5, FIG. 5 being taken substantially along the line 5—5 in FIG. 6.
Figure 7:
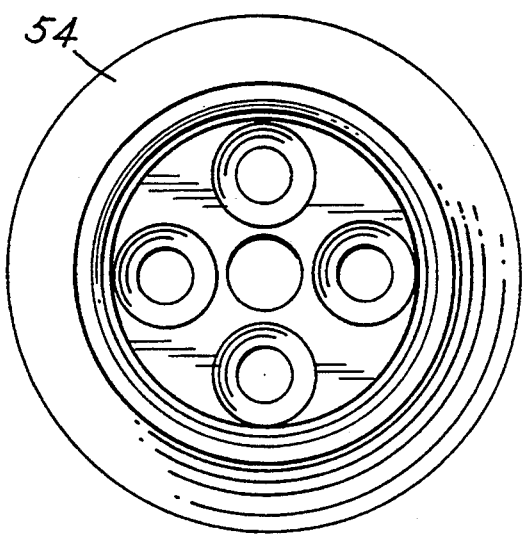
FIG. 7 is a bottom plan view of the base illustrated in FIG. 5.

FIGS. 1 and 2 illustrate a filling and capping system 10 that receives empty containers from an in-feed conveyor 12. The containers are transferred from conveyor 12 to the filling machine 10 by an in-feed worm 14 and a filling machine transfer starwheel 16. Filling machine 10 may be of any type well known in the art. After filling, the containers are transferred to a cap or closure application machine 18 by an in-feed star wheel 20. Capping machine 18 is illustrated in FIG. 2 as being of the type for application of plastic caps C to the threaded necks of beverage containers A. A rotating turret 25 (FIG. 1) moves with a rotating capper table 24. Capper starwheels 26 and 28 located above table 24 also rotate with a turret 25, and provide lateral support to the sidewall and neck portions of the containers A as they are moved in a circular path by rotary table 24. Guide rails 30 and 32 hold the containers in the upwardly opening capper star wheel pockets.

Containers A, which may be filled with carbonated beverage or any other liquid product, are supplied to rotary table 24 by in-feed or transfer starwheel 20. Before entering the rotary table 24, an internally threaded plastic cap or closure C is loosely deposited on the neck of each container A by a closure feeding mechanism 34, which includes a cap feeding chute 36. The closures C are successively engaged by rotating application heads 38 on turret 25, and are applied to the threaded necks of the containers as the containers are moved beneath the heads by rotary table 24. To the extent thus far described, machine 10 and system 18 are similar to those disclosed in U.S. Pat. No. 5,012,630, to which reference may be had for more detailed description. Other exemplary types of closure systems with which the present invention may be employed are disclosed in U.S. Pat. Nos. Re 32,237, 4,624,098 and 4,663,913. As will be apparent from the discussion to follow, the apparatus and method of the present invention may be employed in connection with any conventional type of threaded closure application system.

Apparatus 50 for measuring threaded closure application torque in accordance with a presently preferred embodiment of the invention is illustrated in FIGS. 3–10 as comprising a hollow enclosure 52 formed by a base 54 threaded into a top shoulder 56. An externally threaded finish 58 substantially projects from an opening 60 at the upper end of shoulder 56. The external contours of base 54, shoulder 56 and finish 58 match the contours and threads of a preselected or predetermined container geometry sufficiently that enclosure 52 may be inserted in place of a container A in FIG. 2, and a cap C may be applied thereto by the capping turret 25 with depending heads 38. Within enclosure 52, finish 58 has a depending neck 62 that is threaded into the upper end of a drive spindle 64. Spindle 64 and finish 58 are mounted by roller bearings 66 within opening 60 so as to be freely rotatable with respect to shoulder 56 and base 54. The lower end 68 of drive spindle 64 is flared radially outwardly, and has diametrically opposed radially extending slots 70 on the lower surface thereof. A hollow guide shaft 72 is threaded into the lower end of drive spindle 64 so as to rotate therewith coaxially with finish 58, shoulder 56 and base 54.

A sensor assembly 74 is mounted within shoulder 56, being affixed to base 54 by screws 76. The upper end of sensor assembly 74 is rotatably coupled to drive spindle 64 by means of keys 78 received in the diametrically opposed slots 70 and in corresponding slots on the opposing face of assembly 74. Thus, the upper end portion 80 of assembly 74 is coupled to rotate with finish 58 and drive spindle 64, while the lower end portion 82 is affixed by screws 76 against rotation with respect to base 54 and shoulder 56. A plurality of legs 84 are rigidly affixed to and bridge sensor assembly portions 80,82. Each leg 84 carries a strain gauge sensor 86 (FIG. 11), which has an electrical resistance characteristic that varies as a function of strain applied to the bridge 84 on which it is mounted, which in turn varies as a function of torque applied to assembly portion 80 with respect to assembly portion 82. Sensor assembly 74 is itself of generally conventional construction, with the exemplary unit illustrated in the drawings being marketed by Sensor Developments, Inc. of Orion, Michigan under Model No. 01183. An electronic circuit assembly 90 is carried within base 54.

Referring to FIGS. 11–12, strain gauge sensors 86 on assembly 74 are electrically connected in a resistance bridge configuration, and are connected to electronic circuit assembly 90 through plug P3 and connector J3. The resistance bridge consisting of strain gauge sensors 86 thus provide an electrical signal indicative of torque applied to finish 58 with respect to base 54 and shoulder 56. An input amplifier U1, pins 1–3 receives this electrical signal, and feeds the same to a second stage amplifier U1, pins 5–7. The output of this second stage amplifier is fed through diodes D2,D3 to a capacitor C4. Diodes D2,D3 prevent discharge of capacitor C4, which therefore stores a voltage indicative of the peak value of the input signal from the strain gauge sensors, which in turn indicates peak value of the torque applied to finish 58 by the capping machine as a cap is applied thereto. A switch SW2 is connected across capacitor C4 for discharging the same preparatory to obtaining a new torque reading.

Capacitor C4 is connected through an amplifier U2, pins 1–8 to an output amplifier U1, pins 8–10. A variable resistor VR2 is connected to the input of amplifier U1, pins 8–9 for setting the amplifier output in correspondence with a zero voltage level at capacitor C4, and a second variable resistor VR1 is connected across amplifier U1, pins 8–10 for setting the amplifier gain. Preferably, variable resistors VR1, VR2 are adjusted so as to scale the output voltage at connector J2 to the torque applied to apparatus finish 58. For example, the output voltage may be scaled to read one millivolt per inch-pound of torque applied to the apparatus finish. A battery B1 is connected through a power switch SW1 and a voltage regulator U3 to supply positive and negative voltage to the circuitry 90 and strain gauge sensors 86 (FIG. 11 ). An amplifier U1, pins 12–14 is connected through a variable resistor VR3 across the positive and negative voltage busses for adjusting the mid point of the supply voltages applied to the circuit ground bus.

In use, switch SW1 is placed in the ON position, and switch SW2 is depressed to discharge capacitor C4. With apparatus 50 and electronics 90 precalibrated on an electronic torque tester, apparatus 50 is placed among the containers A being fed to the closure application system 18 (FIGS. 1 and 2). The apparatus travels through the machine at normal operating speed, and a closure or cap is applied thereto by turret 25 and heads 38. As the closure is applied to the apparatus, the strain gauge sensors 86 (FIG. 11) develop an electrical signal as a function of the torque applied by the system to apparatus finish 58, and the peak value of this signal is stored on capacitor C4. After the apparatus emerges from the closure application system, the apparatus is removed from the conveyor line, and a volt meter is connected to output connector J2 to read the application torque in units of volts or millivolts. The apparatus may be immediately reused by removing the cap from finish 58, depressing switch SW2 to clear the previous torque reading, and then reinserting the apparatus into the line of containers being fed to the capping machine. On the other hand, if no additional reading is desired, switch SW1 is moved to the OFF position for storage.

We claim:

1. A self-contained apparatus for insertion among containers of predetermined configuration fed to a closure application system for measuring closure application torque applied by such system, said apparatus comprising:

an enclosure having a hollow base, a hollow shoulder portion separate from said base affixed to and extending from said base, said shoulder portion having an axial opening, and a finish portion with external threads extending from said shoulder portion, said base, said shoulder portion and said finish portion together having an external contour to match the external contour and threads of containers of said predetermined configuration, a neck affixed to and depending from said finish portion through said axial opening into said hollow shoulder portion, bearing means within said opening rotatably supporting said neck such that said neck and said finish portion are rotatable with respect to said hollow shoulder portion and said base, and a strain gauge sensor assembly disposed within said hollow shoulder portion, said strain gauge sensor assembly having one axial end coupled to said neck for corotation with said neck and said finish portion and another axial end affixed to said base within said hollow shoulder portion so as to supply an electrical signal as a function of torque applied by the system to said finish portion with respect to said shoulder portion and said base as a closure is threaded by the system onto said finish portion, and an electronic circuit board assembly disposed within said hollow base and including means for storing maximum value of said signal to indicate said applied torque, output means from which said maximum value may be selectively read, means for resetting said storing means to prepare for a new torque measurement, a battery and a power switch for selectively applying electrical power from said battery to said electronic circuitboard assembly and said sensor assembly, said hollow base having an axially open bottom remote from said shoulder portion through which said output means on said circuitboard assembly, said resetting means on said circuitboard assembly and said power switch means on said circuitboard assembly are all manually accessible to an operator.

2. The apparatus set forth in claim 1 wherein said sensor assembly comprises a plurality of strain gauges and means connecting said strain gauges in a bridge configuration.

3. The apparatus set forth in claim 1 wherein said output means comprises means on said circuitboard assembly for connection through said open bottom to an external volt meter.

4. The apparatus set forth in claim 1 wherein said hollow base has an axially facing wall opposed to said open bottom, said other axial end of said sensor assembly being affixed to said wall.

5. The apparatus set forth in claim 4 wherein said shoulder portion is threaded onto said base.

6. The apparatus set forth in claim 1 wherein said storing means comprises a capacitor, and wherein said resetting means comprises a pushbutton switch connected across said capacitor.

7. The apparatus set forth in claim 6 wherein said output means comprises electronic amplifier means and means for scaling gain of said amplifier means such that output of said amplifier means is in units of torque/volt.

* * * * *